Patented May 21, 1940

2,201,823

UNITED STATES PATENT OFFICE 2,201,823

PROCESS FOR MANUFACTURING ALKYLATED HYDROCARBONS

William E. Bradley, Los Angeles, Calif., assignor to Union Oil Company of California, Los Angeles, Calif., a corporation of California No Drawing. Application March 5, 1938, Serial No. 194,175

12 Claims. (Cl. 196—10)

The present invention relates to a treatment of hydrocarbon oils, and more particularly pertains to the manufacture of hydrocarbons of an iso-paraffinic character particularly suitable for use in automobile and aviation engines.

In one specific embodiment the invention comprises the combining of iso-paraffinic hydrocarbons with olefinic hydrocarbons to produce alkylated iso-paraffinic fractions displaying the above described characteristics.

Olefinic hydrocarbons occur along with corresponding paraffinic or saturated hydrocarbons in commercial hydrocarbon mixtures such as those encountered in the cracking of petroleum, in gas-making processes and as by-products in various chemical industries. In general they are more chemically active than other classes of hydrocarbons, particularly if they contain more than one double bond. Even under mild catalytic influences these olefinic hydrocarbons exhibit a high reactivity in their tendency to polymerize and form substances of higher molecular weight. This instability is frequently highly disadvantageous since the polymers which develop on storage are of a gummy character and impart color to the oil or distillate.

It is one of the objects of the present invention to provide for a more effective utilization of the olefinic constituents of commercial hydrocarbon mixtures, and particularly to those occurring in the gases from oil cracking processes to produce valuable derivatives therefrom. The processes described herein may also be applied to individual olefins produced by special chemical methods or by fractionation of the mixtures.

It has been previously discovered that high anti-knock hydrocarbon fractions may be obtained by a chemical combining of iso-paraffinic hydrocarbons with the above described olefin hydrocarbons in the presence of catalysts such as sulfuric acid. This reaction between one or more molecules of olefin and one molecule of the iso-paraffinic hydrocarbon produces an alkylated iso-paraffinic molecule. This product of reaction is termed an "alkylated hydrocarbon" to distinguish it from a "polymer" which is the product resulting from the interaction of two or more olefin molecules.

Theoretically, the reaction between the iso-paraffins and olefins in the presence of an alkylating catalyst of the type of sulfuric acid is of a simple character. Thus, the reaction which takes place when iso-butane is reacted with a butene in the presence of sulfuric acid may be expressed by the following equation:

The above equation shows the union of one molecule of iso-butane with one molecule of a butene to produce one molecule of an iso-octane. Similar reaction equations may be written for the alkylation of the above or other iso-paraffins with various olefins.

It is well known that olefins, as stated above, when subjected to proper reaction temperatures and pressures in the presence of catalysts of the type of sulfuric acid, tend to form polymers. In fact, this tendency to polymerization, at least under certain conditions, occurs in preference to alkylation, so that, if a mixture of iso-paraffinic or even cyclic hydrocarbons and olefins is brought in contact with sulfuric acid catalyst the reaction products will be found to contain only a relatively small percentage of saturated alkylated products of reaction, the greater portion of the olefin and particularly the more reactive forms thereof, such as the di-olefins and some of the iso-olefins having undergone polymerization to produce unsaturated polymers in preference to their addition to the iso-paraffinic or cyclic hydrocarbons.

It is, therefore, the main object of the present invention to provide a process wherein alkylation of the iso-paraffins shall be favored in preference to the polymerization of the olefins introduced into the reaction zone for the purpose of combining with the iso-paraffinic hydrocarbons. It is a further object of the invention to modify the acid catalyst employed in such a manner that said modified catalyst will tend to hinder polymerization of the olefins and simultaneously promote the combining of said olefins with the iso-paraffinic hydrocarbons to produce higher boiling iso-paraffinic hydrocarbons.

I have discovered that a reaction between iso-paraffins and olefinic hydrocarbons or olefin-containing gases may be obtained in the presence of a catalyst containing an insoluble metal salt which favors alkylation in preference to the polymerization of the olefins. It has been further discovered that the alkylating reaction between iso-paraffins and olefinic hydrocarbons may be realized by contacting said iso-paraffins and olefins, at optimum temperatures and pressures, in the presence of an acid catalyst containing relatively small percentages of an insoluble metal salt which favors the alkylation reaction in preference to the polymerization of the olefins. It has been still further discovered that substances such as the salts of cadmium, zinc, mercury, silver, copper and barium, and particularly the phosphates, sulfates, chlorides, nitrates and acetates of said metals as well as similar materials or mixtures thereof, are highly suitable as addition compounds or modifying agents in that when combined with an acid catalyst of the type of sulfuric acid, these substances or mixtures thereof tend to permit the combining of the olefins with iso-paraffins to produce high boiling iso-paraffinic hydrocarbons in preference to side reactions of the type of polymerization.

The invention may further be stated to reside in the treatment of the iso-paraffinic hydrocarbons with olefinic and olefin-containing gases in the presence of sulphuric acid catalyst containing a reaction modifying agent of the type of the phosphate, sulfate, chloride, nitrate and acetate salts of cadmium, zinc, mercury, silver, copper, barium or the like, whereby the polymerization of the olefins is hindered because of the tendency of the catalyst to cause the alkylation of the iso-paraffinic hydrocarbon. The invention still further resides in the treatment of relatively low boiling iso-paraffinic hydrocarbons such as iso-butane and/or iso-pentane with relatively low boiling olefinic hydrocarbons, such as the olefinic fractions contained in gases resulting from petroleum cracking operations, in the presence of a sulfuric acid catalyst containing the phosphates, etc., of the above enumerated metals, or mixtures thereof, whereby the products of reaction comprise higher-boiling iso-paraffinic hydrocarbons having a high anti-knock value suitable as fuel for use in automobile and aviation engines, said products of alkylation being substantially free of polymers. The invention still further resides in the use of relatively small percentages of the above described salts in combination with the sulfuric acid catalyst, these salts comprising between about 1% and 10% of the catalyst employed.

The term "insoluble metal salts" employed in the present disclosure includes the phosphates, sulfates, chlorides, nitrates and acetates of the above enumerated and like metals. This term should not be considered as being limited to the metal salts which are absolutely insoluble in the acid catalyst, but is deemed to extend to salts having such a limited solubility in such acid as to fall within the class of the materials described.

The following examples are presented to show the advantages obtainable when using a catalyst mixture of the type described herein. In these experiments the iso-paraffinic fraction employed comprised a very narrow cut obtained from the stabilization of natural gasoline. An analysis of this fraction indicated that it consisted of approximately 89% iso-butane, 3% n-butane and 8% propane. It is obvious that the iso-paraffinic fraction to be alkylated according to the present invention may consist of hydrocarbons other than the iso-butane such as for example iso-pentanes, or may comprise a mixture containing these and other iso-paraffins.

A specific olefin-containing fraction employed in the experiments was derived from petroleum cracking operations and has substantially the following composition:

| | Percentage by volume of liquid |
|---|---|
| Ethylene | 0.32 |
| Ethane | 3.01 |
| Propylene | 11.10 |
| Propane | 20.53 |
| Iso-butane | 17.59 |
| Iso-butylene | 15.30 |
| n-Butylene | 14.24 |
| n-Butane | 17.91 |
| | 100.00 |

It is thus seen that the above olefin-containing gases contained about 42.5% unsaturates, the ratio of propylene to the butylenes being about 1:3.

Three runs were made in one of which the catalyst consisted of 90% sulfuric acid without the addition of any modifying agent, whereas in the other two runs small quantities of cadmium phosphate and zinc phosphate, respectively, were added to the sulfuric acid of the above mentioned concentration. In each case the reaction was continued for about nine hours at a temperature of about 70° F. and at a pressure of between 40 and 70 lbs. per sq. in. gauge. The procedure used was as follows: About 1800 grams of the above described iso-butane containing fraction was first commingled with the given catalyst and between about 2000 and 2400 grams of the olefin-containing gas fraction was gradually conveyed to the reaction zone, the rate of olefin addition being about 2.9 to 3.3 ml. per minute. During the reaction, the mixture was maintained in a state of violent agitation.

The products of reaction resulting from the alkylation with 90% sulfuric acid alone, after stabilization, had a gravity of 65.4° A. P. I., the yield of alkylated hydrocarbons, based on the percentage by weight of the olefins used, being 164.6% and containing 11.1% by weight of olefins. These olefins were the result of polymerization during the above described alkylation reaction. The overhead fraction distilled to an end point of 310° F. (thus producing a material satisfactory for use in an aviation gasoline), comprised about 110.1% by weight based on the olefins used, had a gravity of 73.0° A. P. I. and an anti-knock rating of 89 by the A. S. T. M. method.

In the case where the cadmium phosphate was added to the 90% H2SO4 catalyst (the quantity of this cadmium salt comprising 1% by weight of the catalyst employed), the stabilized alkylated hydrocarbon had a gravity of 67.4° A. P. I. The yield of these alkylated hydrocarbons, based on the percentage by weight of the olefins, was 168.5%, this fraction however containing only 8.6% by weight of olefins. It is thus seen that the addition of 1% of cadmium phosphate to the sulphuric acid catalyst increased the yield of the alkylated hydrocarbons and simultaneously decreased the products of polymerization. The yield of aviation gasoline was also increased by using the cadmium phosphate modifying agent, the overhead fraction distilled to the above mentioned 310° F. end point comprising 116.6% by weight based on the olefins, with a gravity of 73.3° A. P. I. and an A. S. T. M. knock rating of 89.

In the third run the catalyst consisted of 90% sulfuric acid and 3% by weight of zinc phosphate. In this case the products of alkylation, after stabilization, had a gravity of 68.1° A. P. I., and a yield of 178.6% by weight based on the olefins. The olefin content of the product was only 5.6%. The yield of aviation gasoline from this fraction was 135.4% based on the olefins used. This fraction was saturated, and had a gravity of 73.1° A. P. I. and an 89 knock rating by the A. S. T. M. method.

The above runs clearly disclose the advantages of adding modifying agents of the above type to the sulfuric acid catalyst. Thus, the addition of 1% of cadmium phosphate, maintaining the other conditions substantially identical, increased the yield of alkylated hydrocarbons and simultaneously decreased the olefin content of the alkylated hydrocarbon fraction by 2.5%. Similarly, the addition of 3% of zinc phosphate to the sulfuric acid catalyst increased the yield of alkylated hydrocarbons by about 14% with a 5.5% decrease in its olefin content.

In carrying out the invention the apparatus used and the conditions of operation chosen in respect to temperature, pressure, proportioning of the reacting constituents, choice of acid and of the modifying or solubilizing agents etc. will be varied to suit the individual case. Thus, although the alkylation reactions described herein were realized at substantially room temperatures, under certain conditions lower or higher temperatures may be employed. Furthermore, the quantity of the modifying agent as well as the concentration of the sulfuric acid catalyst may be increased or decreased with a corresponding decrease in the quantity or ratio of the acid necessary to promote the alkylation operation.

As many apparent and widely different embodiments of the invention may be made without departing from the spirit and scope thereof, it is to be understood that there is no intention to be limited by any specific embodiments disclosed herein, except as defined in the appended claims.

I claim:

1. In a process of reacting iso-paraffinic hydrocarbons with olefinic hydrocarbons to produce alkylated iso-paraffinic hydrocarbons, the step of conducting said alkylation reaction in the presence of a sulphuric acid catalyst containing a metal salt of limited solubility in said sulfuric acid and adapted to increase the yield of alkylated iso-paraffinic hydrocarbons and to decrease the polymerization of the olefinic hydrocarbons.

2. In a process according to claim 1, wherein the metal salt comprises a relatively small percentage of the sulfuric acid catalyst employed.

3. In a process according to claim 1 wherein the metal salt comprises between about 1% and 10% of the catalyst employed.

4. In a process of synthesizing hydrocarbons by alkylation of isoparaffinic hydrocarbons of the class of isobutane and isopentane with olefinic hydrocarbons, the steps of commingling the iso-paraffinic hydrocarbons with a catalyst comprising sulphuric acid and a metal salt having limited solubility in the sulphuric acid and adapted to increase the yield of alkylated isoparaffinic hydrocarbons and to decrease the polymerization of the olefinic hydrocarbons, and gradually introducing the olefinic hydrocarbons into said mixture, thereby causing the combining of the isoparaffins and olefins to produce alkylated hydrocarbons.

5. In a process according to claim 4, wherein the metal salt comprises a relatively small percentage of the sulfuric acid employed as the catalyst.

6. In a process according to claim 4, wherein the metal salt comprises between about 1% and 10% of the catalyst employed.

7. In a process of reacting iso-paraffinic hydrocarbons with olefinic hydrocarbons to produce alkylated iso-paraffinic hydrocarbons, the step of conducting said alkylation reaction in the presence of a catalyst containing sulfuric acid and zinc phosphate.

8. In a process of reacting iso-paraffinic hydrocarbons with olefinic hydrocarbons to produce alkylated iso-paraffinic hydrocarbons, the step of conducting said alkylation reaction, in the presence of a catalyst containing sulfuric acid and relatively small percentages of zinc phosphate.

9. In a process of reacting iso-paraffinic hydrocarbons with olefinic hydrocarbons to produce alkylated iso-paraffinic hydrocarbons, the step of conducting said alkylation reaction, in the presence of a catalyst containing sulfuric acid and cadmium phosphate.

10. In a process of reacting the iso-paraffinic hydrocarbon with olefinic hydrocarbons to produce alkylated iso-paraffinic hydrocarbons the step of conducting said alkylation reaction in the presence of a catalyst containing sulfuric acid and small percentages of cadimum phosphate.

11. A process for the synthetic production of alkylated hydrocarbon fractions substantially free from products of polymerization which comprises commingling isoparaffinic hydrocarbons of the class of isobutane and isopentane with a sulfuric acid catalyst containing a metal salt which is relatively insoluble in the sulphuric acid and adapted to increase the yield of alkylated hydrocarbons and to decrease the polymerization reaction, maintaining said isoparaffinic-catalyst mixture at substantially room temperature and at pressures sufficient to maintain the isoparaffins substantially in a liquid state and gradually introducing olefinic hydrocarbons into said mixture to effect the alkylation of the isoparaffins with the olefins.

12. In a process according to claim 11 wherein the metal salt comprises between about 1% and 10% of the catalyst employed and wherein the isoparaffinic-catalyst mixture is maintained in a state of agitation during the introduction of the olefins.

WILLIAM E. BRADLEY.